(12) United States Patent
Yoffe et al.

(10) Patent No.: US 8,924,708 B2
(45) Date of Patent: *Dec. 30, 2014

(54) SECURITY SWITCH

(71) Applicants: Simon Yoffe, Givat Shmuel (IL); David Yoffe, Givat Shmuel (IL)

(72) Inventors: Simon Yoffe, Givat Shmuel (IL); David Yoffe, Givat Shmuel (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/969,748

(22) Filed: Aug. 19, 2013

(65) Prior Publication Data

US 2013/0340069 A1 Dec. 19, 2013

Related U.S. Application Data

(63) Continuation-in-part of application No. 13/020,042, filed on Feb. 3, 2011, now Pat. No. 8,522,309, which is a continuation-in-part of application No. 11/741,751, filed on Apr. 29, 2007, now Pat. No. 8,090,961.

(60) Provisional application No. 60/881,510, filed on Jan. 22, 2007.

(30) Foreign Application Priority Data

Feb. 5, 2010 (RU) .................................. 201000159

(51) Int. Cl.
*H04L 29/06* (2006.01)
*G06F 21/30* (2013.01)
*G06F 21/55* (2013.01)
*G06F 21/70* (2013.01)
*G06F 21/82* (2013.01)

(52) U.S. Cl.
CPC ................ *G06F 21/30* (2013.01); *G06F 21/55* (2013.01); *G06F 21/70* (2013.01); *G06F 21/82* (2013.01)
USPC ........................................................ 713/152

(58) Field of Classification Search
CPC .......... G06F 21/30; G06F 21/55; G06F 21/70; G06F 21/82
USPC ........................................................ 713/152
See application file for complete search history.

(56) References Cited

U.S. PATENT DOCUMENTS 7,992,024 B2 8/2011 Islam et al.
2011/0131639 A1 6/2011 Buhler et al.

OTHER PUBLICATIONS

Rabiul Islam, Anil Sabbavarapu, Rajesh Patel, Manish Kumar, Jeff Nguyen, Binta Patel, Amrish Kontu, "Next Generation Intel® ATOM™ Processor Based Ultra Low Power SoC for Handheld Applications", IEEE Asian Solid-State Circuits Conference, Nov. 8-10, 2010, Beijing, China.

*Primary Examiner* — Mohammad W Reza
(74) *Attorney, Agent, or Firm* — Nathan & Associates Patent Agents Ltd.; Menachem Nathan

(57) ABSTRACT

System and method for securing a personal device that includes a device core and a peripheral device from unauthorized access or operation. The system comprises an isolated switch, included fully or partially within an envelope of the personal device. The isolated switch cannot be affected in its operation by either the device core or the peripheral device. The switch may be operated by an authorized user of the personal device either preemptively or in response to a detected threat. In some embodiments, the isolated switch includes an isolated controller which can send one or more signals to the peripheral device and/or part of peripheral device. In some embodiments, the isolated switch includes an isolated internal component and an isolated external component, both required to work together to trigger the isolated switch operation. In some embodiments, the isolated switch includes an isolated disconnector for connecting and disconnecting the device core from part of the peripheral device.

20 Claims, 16 Drawing Sheets

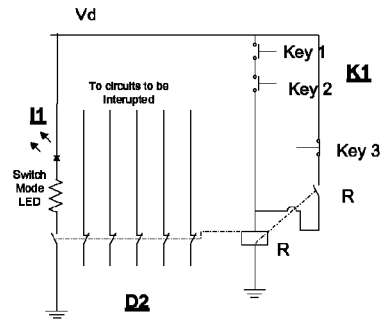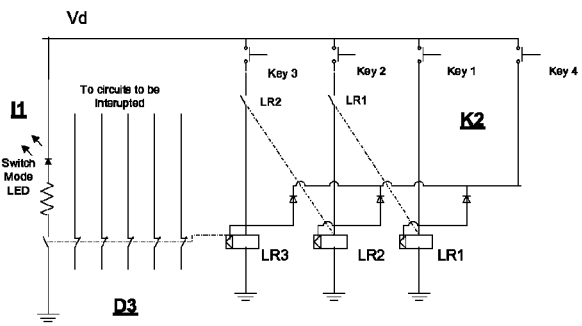
FIG. 10　　　　　　　　FIG. 11
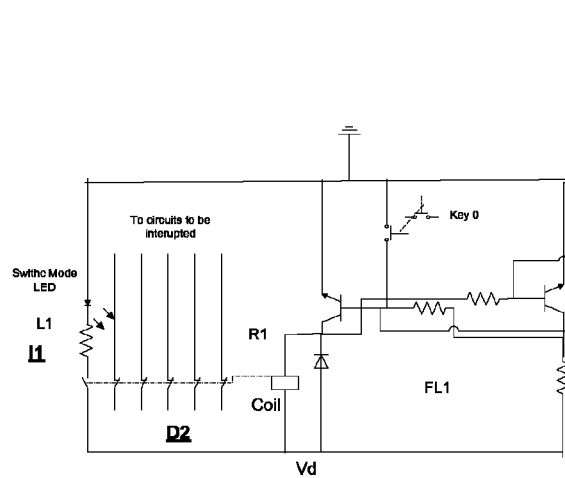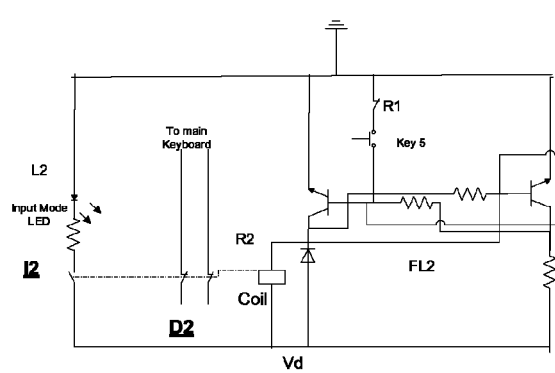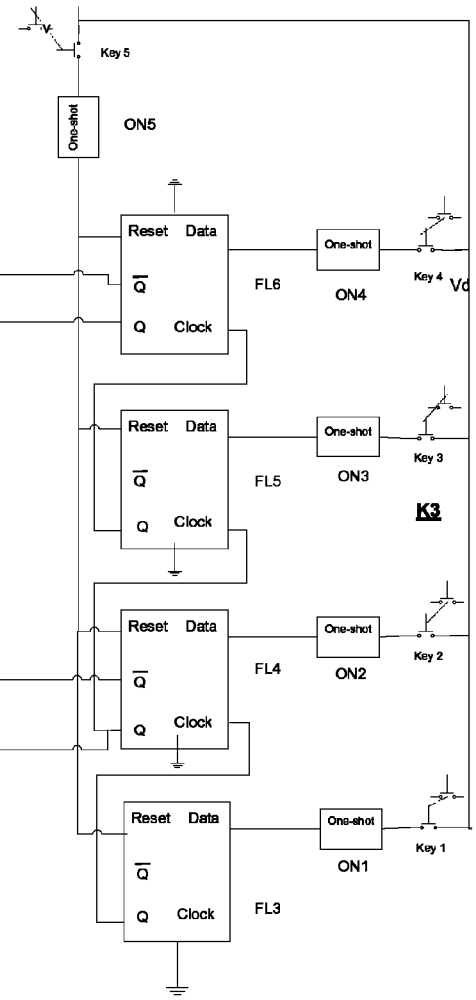
FIG. 12

SECURITY SWITCH

CROSS REFERENCE TO RELATED APPLICATIONS

This application is a Continuation in Part of U.S. patent application Ser. No. 13/020042, titled "Security Switch" and filed Feb. 3, 2011 (now U.S. Pat. No. 8,522,309), which was a Continuation in Part of U.S. patent application Ser. No. 11/741,751 titled "Security Switch" and filed 29 Apr. 2007, which claimed priority from U.S. Provisional Patent Application No. 60/881,510 filed 22 Jan. 2007. This application further claims priority from Russian patent application No. 201000159 filed 5 Feb. 2010, now allowed as EAPO patent No. 013885. All of the abovementioned patents and patent applications are incorporated herein by reference in their entirety.

TERMS

Authorized user—owner or permitted operator of a personal device.
Unauthorized user—any user or software that does not have an explicit permission to operate the personal device.
Unauthorized access—any attempt of an unauthorized user to access or operate a personal device
False indication/notification—an indication showing one state, while another "real" state is different.
Hooked component—a component connected in parallel with other device(s) to the same input element, in such way that both devices can operate together, but the hooked component is isolated from the other device(s).
"Man in the middle"—a component logically placed between two other components and which can control the information passed between the two other components.
Secure Input—an input readable only to a permitted component, meaning that the input of the permitted component cannot be revealed by others components.
Internal—enclosed within an envelope or surface of the personal device or positioned at least partially on the surface of the envelope of the personal device.
External—separate from a personal device but which can be connected to the personal device or plugged into the personal device.
Isolated switch—a switch that cannot be operated or affected by any entity or factor except an authorized user.
Independent operation—an operation that cannot be affected by any entity or factor except an authorized user.
Isolated controller—a controller that cannot be operated or affected by any entity or factor except an authorized user.

FIELD AND BACKGROUND

Embodiments disclosed herein relate to the security of personal communication or computing devices which communicate with other devices which use software for operation. Personal software operated devices or appliances (hereinafter "personal devices") such as mobile phones, IP-phones, pocket PCs, PDAs, laptop computers, desktop computers and network switches, use a variety of hardwired or wireless communication means for communication with other devices. A remote unauthorized user can adversely use these communication means to try and break open the personal device security and obtain personal and other information on the personal device user or owner, or to perform unauthorized operations on the user's behalf. A single personal device may have a number of different communication means such as phone-lines, cables, a wireless LAN, Bluetooth, etc, which only increases the security risk. These communication means can be used to retrieve private information, audio/video information, user location information (track where user is located when personal device is using out communication) or transmitted information, and can be used for transmitting data on the user's behalf without his/her knowledge.

Devices with permanently installed or accessory sensor components such as a microphone, earphone(s), speakers, camera, etc, are able to capture the information at a user location. Devices with permanently installed or accessory communication components such as a modem, a LAN adapter, a wireless LAN adapter, Bluetooth, GSM, etc, are able to transmit information and may reveal the user location. When signals are transmitted from the user location, the transmission can be used for tracking the user location. Components of a device/appliance that are controlled by software and electronic switching devices may be controlled by an unauthorized user even if they were disabled earlier by the authorized user. The components can be controlled without the user noticing the change in mode of operation. For example, a mobile phone may look "switched off" but may still be functioning or even transmitting, making a call or sending an SMS on the user's behalf, or capturing private conversations around its location.

Local authorized or unauthorized users can easily modify the software operating the personal device, thereby causing a security breach, e.g. by downloading a virus-affected software update. This scenario of software modification is very common: on one hand it is much easier than hardware modification, and on the other hand it is much harder to verify such a modification, or notice unwanted change.

At present, the problem of unauthorized access is handled by different types of security software such as firewalls, anti-virus programs, anti-spyware programs and security systems. However, each new software security system is eventually overcome by new hacking methods, viruses, worms, Trojans and other threats. This creates an endless competition between security providers and unauthorized users. In essence, software security is hard to implement and/or prove. Even if the theoretical model of the security is proven, there may still be a mistake or bug in the implementation that allows a break in the security. Consequently, software security solutions cannot be trusted.

Hardware security solutions are known and include: devices used to isolate telephone lines in order to prevent unauthorized capture of audio information from phone user (see U.S. Pat. No. 5,402,465 and US Pat. Application No. 20050271190); data line switches for computers that disconnect a computer line physically from the Internet, working in manual and/or automatic mode (US Pat. Application No. 20030062252); a power off method for a wireless peripheral device, which terminates power to all parts of the wireless device except the control chip by a certain operation on a connect button (US Pat. Application No. 20050009496); a switch that powers-on a PDA in response to the stylus being removed from the PDA's stylus holder and, selectably, powers-off the PDA in response to the stylus being replaced into the PDA (U.S. Pat. No. 6,233,464); a mobile phone with two input modes, whereby a switch of input modes is attained by changing an electrical connection between the main printed circuit board (PCB) in the phone and the front and back PCBs (U.S. Pat. No. 7,031,758); the NetSafe Computer Security Switch, which uses a simple physical switching technology in a way that allows a computer or group of computers to quickly and easily block a communications signal from entering the computer(s) and restart the signal without any software and without the need to power down, reboot, or run software on the computer(s) (US Pat. Application No. 20040243825); a wireless button for a laptops, offered by the Hewlet Packard Corporation in its line of Pavilion laptops (hereinafter the "HP wireless button"), which enables or disables all integrated wireless components in the laptop (e.g. WiFi and Bluetooth), and a wireless light that indicates simultaneous the computer's overall wireless state (enabled or disabled); the portable electronic device that disconnects a receiving antenna from the duplexer of a mobile phone (US Pat. Application No. 20040203536A1).

All existing protection solutions suffer from one of two disadvantages: either the switch is "external" and can therefore be tampered with by an external factor, or the switch is internal but not fully isolated from the device itself (and therefore can be manipulated by the software of the device). Consequently, existing solutions cannot provide simultaneous temporary protection from audio/video information capture, cannot provide simultaneous temporary protection from both audio/video information capture and unauthorized access and user location\device location and cannot provide secure security mode exit or prevent capture of the logic required for exiting the security mode. Existing internal switches cannot provide prevention of false notification about the device security mode in a device with already broken software security, i.e. in a state in which an unauthorized user gains access or control of the personal device despite software protection solutions.

There is therefore a widely recognized need for, and it would be highly advantageous to have a simple internally isolated hardware security solution for the users of the above mentioned personal devices that does not suffer from the above mentioned software and hardware solution disadvantages.

SUMMARY

Embodiments disclosed herein disclose hardware security solutions that overcome the problems of hardware and software security solutions mentioned above. They provide a user of a personal device with hardware means for protecting information such as private information, audio/video information, user location information or transmission information and for performing operations securely. The hardware means, referred to as "security switch" or "isolated switch", are internal to the personal device and is isolated, both "internal" and "isolated" being defined above. The "isolation" also means that the control elements of the switch do not have any external communication capability and are protected from remote operation/manipulation.

In some embodiments a security switch disclosed herein is a component having (a) control elements that are not connected electrically to an environment from which they should be isolated and shielded, or that are decoupled in such a way that both electrical and magnetic fields cannot influence their operation, and (b) switching elements that cannot be connected, disconnected or bypassed by elements other than the control elements in (a).

The security switch may be mechanical (i.e. electrical contacts switched mechanically) or electronic/electrical. When mechanical, its control is already isolated because it can be operated only by manual physical operation of the user, not by the device itself. A mechanically operated switch should not have an electrically operated bypass. When electronic/electrical, the security switch is isolated electrically, i.e. completely separated electrically from other elements or components of the personal device.

The principle of operation of the security switch disclosed herein relies solely on manual disconnection (or connection) of audio/video/communication or power supply components in the personal device in order to avoid unauthorized access to the information or personal device. This provides full isolation even in cases of full access to the device software or remote access to electronic components of the device, in the sense that an unauthorized user is not able to connect electrical circuits that are switched off manually, and a beneficiary side effect of power saving in case of power supply disconnection.

Two main modes of operation are provided: "mode 1"—manual switching by an authorized user (or simple "user") for preventing capture of audio/video information from the user; "mode 2"—manual switching by the authorized user for preventing unauthorized determination of the user location or capture of other information. In mode 1, the user can receive visual information (for example incoming calls, SMS, memos, files, etc) yet is protected from being listened to, recorded or visually captured by unauthorized access to his personal device. In mode 2, the communication to the device is completely disconnected, so the device location cannot be discovered by any means and no information transfer is possible. There is also a possibility to combine modes 1 and 2 into a "combined mode". Note that mode 2 is not a substitute for mode 1, since in case of unauthorized access; audio/video information can be captured and stored in the device memory, then transmitted after the user exits mode 2.

The switch allows the user of a personal device to temporarily change the mode of operation when in need of privacy and wants to avoid possibility of spying after him/her by capturing his/her audio/video information or tracking his location. A manually operated security switch allows the user to disconnect components that can capture audio/video and user input information or transmit signals from/to the user's personal device. When an electrical circuit is broken manually, it cannot be reconnected by an unauthorized user even in case of full access to the device software or by remote access to an electronic personal device. When all components capable of capturing audio/video information—i.e. microphone(s), headphone(s), speaker(s), and camera(s) are disconnected, information cannot be obtained by an unauthorized user. When all components capable of transmitting a signal from or to a user's device or appliance (i.e. RF, WiFi, Bluetooth, NFC, and LAN) are disconnected, the user location and other private information cannot be obtained by an unauthorized user. Embodiments of systems and methods disclosed herein are not concerned with software security, but with protecting certain private information by disabling devices capable of capturing information or transmitting signals, even in cases when the device security is already broken. The protection is based on an operation that can be performed only by an authorized user (manual disconnection of the relevant components) and that cannot be performed by the software of the device or by the device itself. The protection is further based on the principle that the operation is not known to the software of the device or to the device itself.

In some embodiments, there is disclosed a system for securing a personal device that includes a device core and a peripheral device from unauthorized access or operation, the personal device having an envelope or surface, the system comprising an internal isolated switch having operating functions that cannot be affected by either the personal device core or by a peripheral device, wherein the isolated switch includes an internal component located within the envelope or at least partially on the surface of the personal device and wherein the isolated switch internal component is selected from the group consisting of a mechanical element without an electrically operated bypass and an electronic/electrical element separated electrically from elements or components of the personal device.

In some embodiments, the isolated switch includes an isolated disconnector for connecting and disconnecting the device core from part of the peripheral device. In some embodiments, the isolated switch includes an isolated internal component and an isolated external component, wherein the isolated internal and external components trigger together the isolated switch operation.

In some embodiments, the peripheral device may be a sensor device, for example a microphone, earphone(s), speakers, camera, etc. In some embodiments, the peripheral device may be a communication device for example a modem, LAN adapter, Wireless LAN adapter, Bluetooth device, GSM device, RF device, etc.

In some embodiments, the peripheral device may be a user input device for example a keyboard, touch screen, etc. In some embodiments, the peripheral device may be a USB device, for example a USB "key" or mass storage device (MSD), a USB Bluetooth device, a USB wireless device or any other known USB device.

In some embodiments, the peripheral device may be a non-USB MSD, a display, a memory, etc.

In some embodiments there is provided a method for securing a personal device that includes a device core and a peripheral device from unauthorized access or operation, comprising the steps of providing an internal isolated switch having operating functions that cannot be affected by either the personal device core or the peripheral device, wherein the isolated switch includes an internal component located within the envelope or at least partially on the surface of the personal device, wherein the isolated switch internal component is selected from the group consisting of a mechanical element without an electrically operated bypass and an electronic/electrical element separated electrically from elements or components of the personal device, and wherein the isolated switch is configured to act as man in the middle between the device core and the peripheral device, and using the isolated switch to protect the device from unauthorized use or access.

BRIEF DESCRIPTION OF THE DRAWINGS

Reference will be made in detail to preferred embodiments disclosed herein, examples of which may be illustrated in the accompanying figures. The figures are intended to be illustrative, not limiting. Although the invention is generally described in the context of these preferred embodiments, it should be understood that it is not intended to limit the spirit and scope disclosed herein to these particular embodiments. The structure, operation, and advantages of the present preferred embodiment disclosed herein will become further apparent upon consideration of the following description, taken in conjunction with the accompanying figures, wherein:

FIG. 10 shows an example of an electrical implementation of an isolated switch disclosed herein;

FIG. 11 shows another example of an electrical implementation of an isolated switch disclosed herein;

FIG. 12 shows an example of an electrical/electronic implementation of an isolated switch disclosed herein;

DETAILED DESCRIPTION

The invention discloses security systems and devices for protecting personal devices and their users from unauthorized access, operation, identity theft or information theft. In particular, the invention discloses a security switch that provides total protection of information related to the personal device or a user of the device. In the following description, like elements appearing in different figures are numbered identically.

Figure 1:
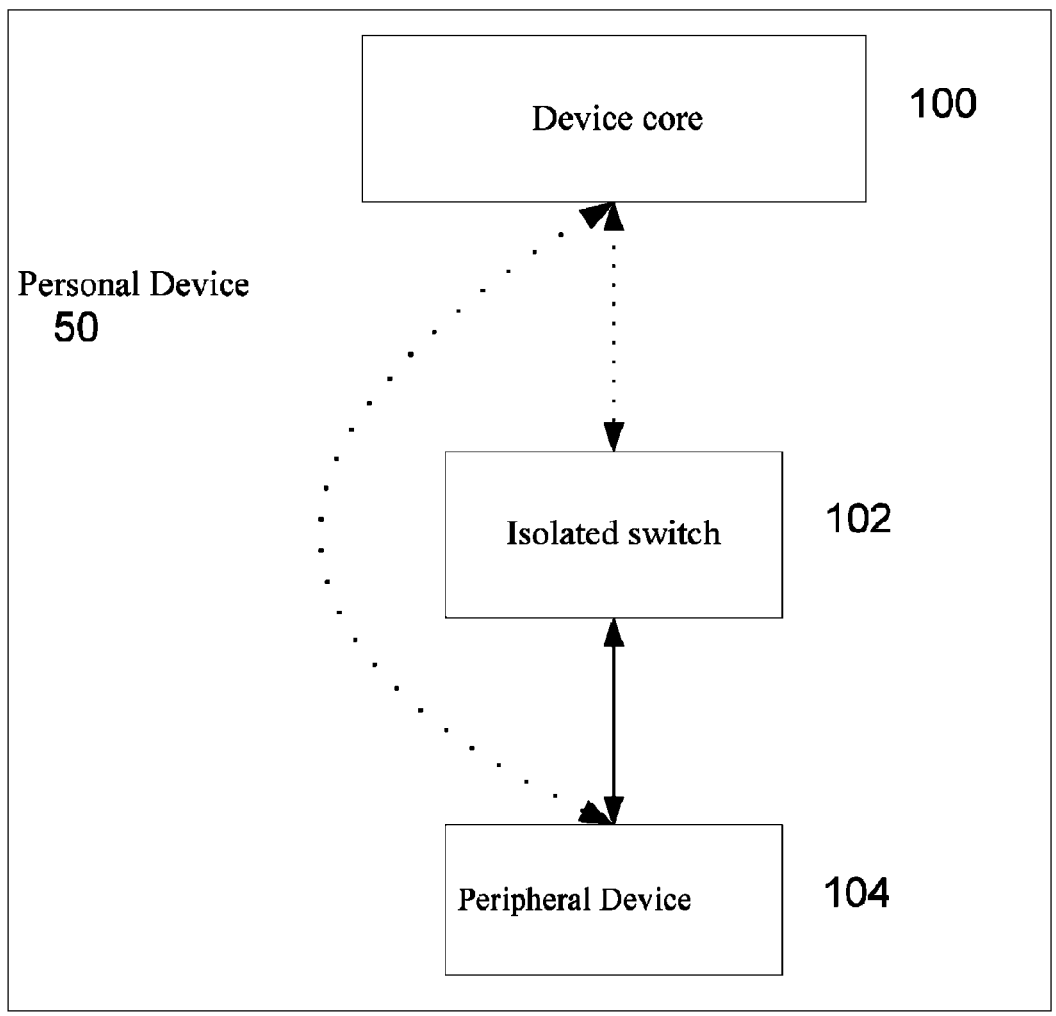
FIG. 1 shows a first embodiment of a personal device with a security switch disclosed herein.

FIG. 1 shows a first embodiment 50 of a personal device with a security switch disclosed herein. Personal device 50 includes a device core 100, an isolated switch 102 and at least one peripheral device 104. The dotted arrows indicate an optional direct connection between device core 100 and peripheral device 104 and/or between device core 100 and isolated switch 102. Device core 100 operates by software and may include one or more controllers (e.g. central processing units (CPUs)), one or more memory units and one or more power management modules.

A peripheral device 104 may include one or more communication components, and/or one or more sensor components, and/or one or more user input components, and/or one or more other peripheral devices. Each of these will be shown in following figures. The communication components may include wireless communication components or wired communication components (e.g. WiFi, RE, Bluetooth, NFC, LAN, and modem). The sensor components may include audio components, video components (e.g. a microphone, speaker or camera). The user input component may include a keyboard or a touch screen. The other peripheral devices may include a USB or non-USB MSD, a display or a memory.

In this and following embodiments and implementations, the peripheral device may be for example as USB device, i.e.

a USB "key" or MSD device, a USB Bluetooth device, a USB wireless device or any other known USB device. Alternatively, the peripheral device may be a non-USB device such as a non-USB MSD, a display, a memory, etc.

Isolated switch 102 is an inventive element disclosed herein, which contrasts with prior art in terms of both structure and function. Isolated switch 102 is an internal component, isolated from other components of the personal device. As defined above, "internal" means enclosed within an envelope of the personal device or positioned at least partially on the surface of the envelope of the personal device. "Isolated" means that the operation of the security switch cannot be affected either directly or indirectly by device core 100 or peripheral devices 104. This isolation prevents manipulation of switch 102 by the software of the personal device. In short, switch 102 can perform operations independently from the personal device (i.e. the personal device cannot affect an operation performed by switch 102) and can operate either in parallel with device core 100 (meaning that both perform independent tasks, in which case there may be a direct connection between device core 100 and peripheral device 104), or as a "man in the middle", meaning that the connection of device core 100 with peripheral devices 104 or the information exchanged therebetween is affected by the operation of the switch, thus the security switch can control and affect the signal/data transferred between them. Note that configuration of the switch as a "man in the middle" between the device core and a peripheral device, allows the user of a personal device to review information and authorize operations transferred between the personal device and the peripheral device. That is, in this configuration, the information transmitted between the personal and peripheral devices is affected by the operation of the switch.

Isolated switch 102 may be implemented in a number of different ways: by electro-mechanical components, by electrical components, by electronic components or a combination of the above.

Figure 2:
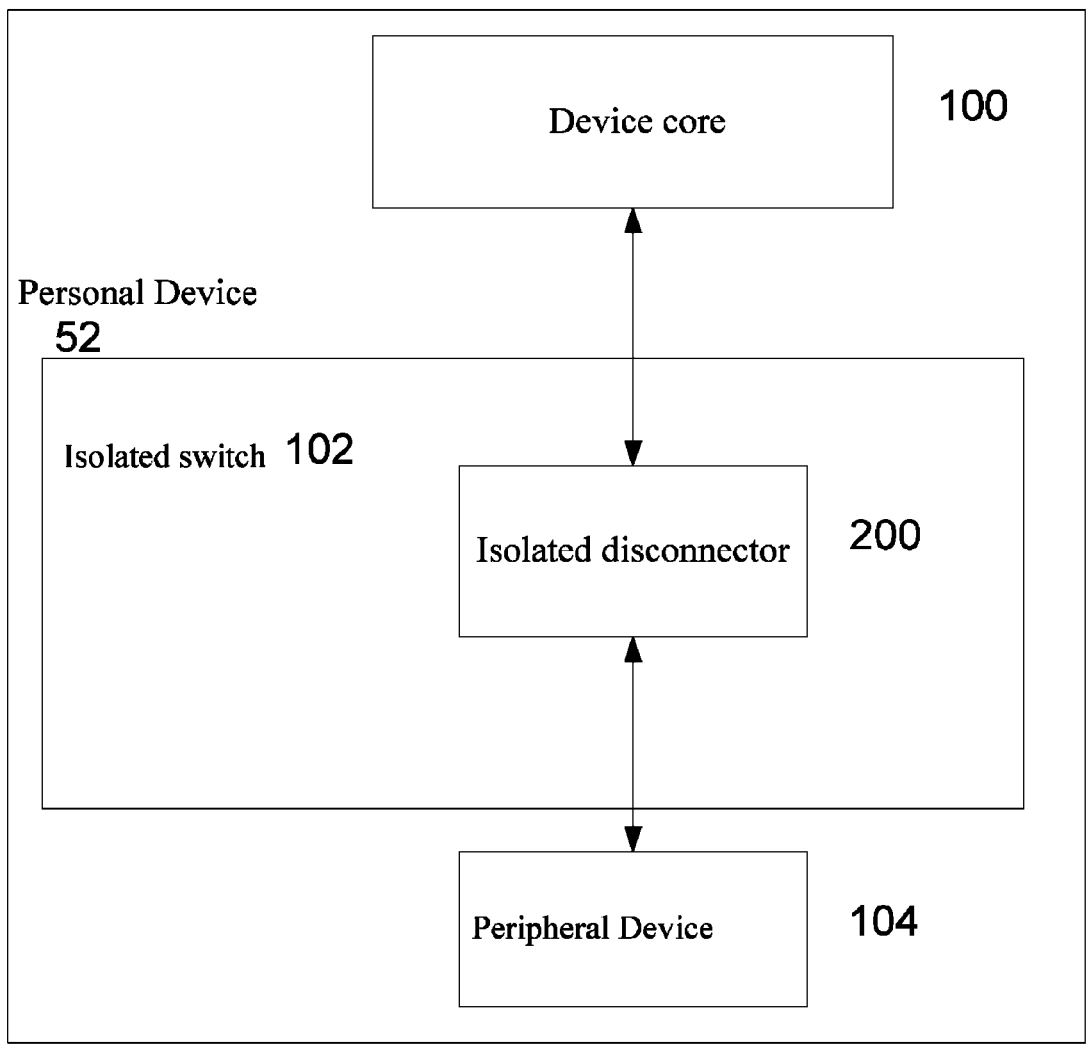
FIG. 2 shows another embodiment of a personal device with a security switch disclosed herein.

FIG. 2 shows a second embodiment 52 of a personal device with a security switch disclosed herein In addition to all the components of device 50, in device 52, isolated switch 102 includes a disconnect/connect component ("disconnector") 200. Disconnector 200 is an inventive sub-component disclosed herein, which contrasts with prior art in terms of both structure and function. It is an internal, isolated (in the sense defined above for switch 102) sub-component, which can disconnect and reconnect different subsets of peripheral devices 104 from the device core. The disconnect operation may be effected by disconnecting (cutting) essential links between the device core and the subset of peripheral devices 104 (e.g. a data line, a power supply line, etc) or by shorting electrically essential links in the subset of peripheral devices 104 (e.g. a data line, sensor terminals, etc). Disconnector 200 may be implemented in a number of different ways: by electrical contacts switched mechanically, by electrical components, by electronic components or a combination of the above.

Exemplarily, the security switch is used as follows: when a threat to an authorized user's privacy or to the personal device security is detected by the user or when the user wishes to perform preventive measures: disconnector 200 is operated by the user to disconnect the relevant subset of peripheral devices 104 from the device core. When the user detects that the threat is over or that preventive measures are not required, he/she operates disconnector 200 to restore the connection of the disconnected subset of peripheral devices 104 to the device core. Alternatively, disconnector 200 is operated by the user to connect the relevant subset of peripheral devices 104 to the device core. When the user detects that the threat is over or that preventive measures are not required anymore, he/she operates disconnector 200 to disconnect (back) the connected subset of peripheral devices 104 from the device core. The disconnection of the power supply will lead to power savings.

Isolated disconnector 200 is different from the HP wireless button, in that the HP wireless button enables or disables all integrated wireless devices simultaneously, while disconnector 200 can disconnect a subset of such devices. The HP wireless button enables/disables all integrated wireless peripheral devices at once and disconnection of a subset of these devices is enabled only by the laptop software. The HP wireless button may not be isolated. In inventive contrast, disconnector 200 is capable of disconnecting any predefined subset of peripheral devices 104 (which includes not only wireless peripheral devices e.g. wired peripheral devices, sensor devices) and is isolated from the personal device in which it integrated. Disconnector 200 is different from the portable electronic device in that this device connects/disconnects only a receiving signal (of RF communication), which still allows sending information from the device by an unauthorized user. In contrast, disconnector 200 can disconnect any predefined subset of peripheral devices (including the RF receiving signal, among others), not limited to communication devices, thereby providing a mode in which sending information from the device by unauthorized user is impossible.

Figure 3:
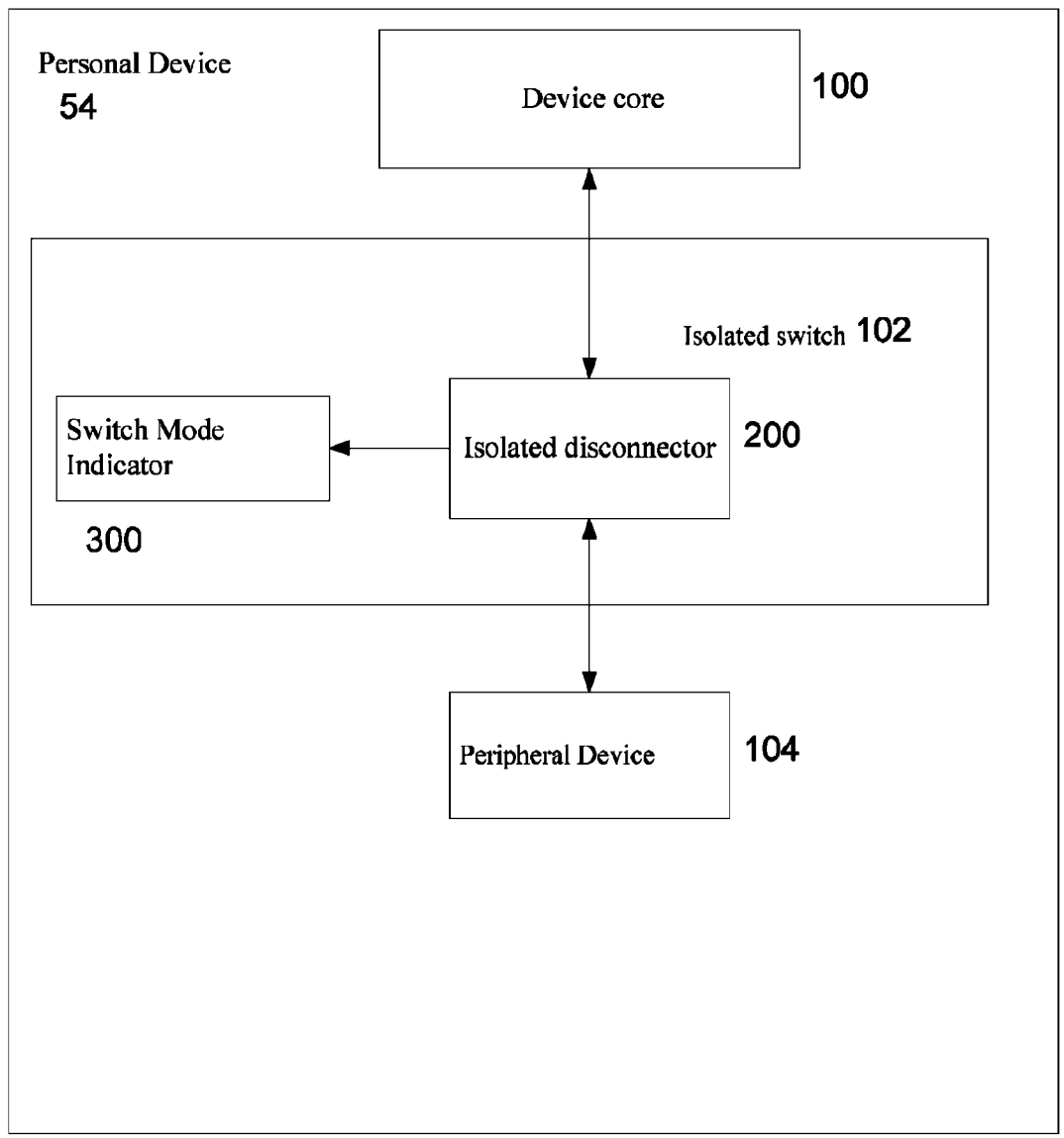
FIG. 3 shows yet another embodiment of a personal device with a security switch disclosed herein.

FIG. 3 shows another embodiment 54 of a personal device with a security switch disclosed herein. Device 54 includes in addition to all the components of device 52 a switch mode indicator (e.g. a LED) 300. Indicator 300 provides visual indication of the state of disconnector 200, i.e. a visual indication of the disconnected/connected subset of peripheral devices 104 or an indication that none of peripheral devices 104 are disconnected/connected by disconnector 200, or an indication of the information passed to or exchanged through disconnector 200. The switch mode indicator is "isolated" in the same sense as disconnector 200 and controlled only by disconnector 200 which contrasts with prior art in terms of structure. This prevents manipulation of mode indicator 300 by the software of the personal device or by other means, meaning that false indication or notification is impossible.

In use, under the same circumstance as described for device 52, the security switch is used as follows: Disconnector 200 is operated by the user to disconnect or connect the relevant subset of peripheral devices 104 from/to the device core. The disconnector then enables mode indicator 300, which is used by the user to visually verify the desired mode of security switch. When the user detects that the threat is over or that preventive measures are not required, he/she operates disconnector 200 to restore/revoke the connection of the disconnected/connected subset of peripheral devices 104 to/from the device core. Disconnector 200 then disables mode indicator 300, which is used by the user to visually verify again the desired mode of the security switch. That is, the security switch can display fully or partially the state of the switch or the information passed to or exchanged through the switch that is affected by the state of the switch to the user (e.g. for the user to review, or to ensure user awareness of the operation being done). Note that this functionality is provided also in all other embodiments that include a mode indicator such as switch mode indicator 300.

Switch mode indicator 300 is different from an indicator in the HP wireless button, in that the HP wireless button indicator is not isolated from the laptop and controlled as well by the laptop software, while indicator 300 is isolated from the personal device in which it integrated. The wireless button indicator may provide false notification/indication (e.g. due to software manipulation), while indicator 300 is controlled only by disconnector 200, which prevents false notification/indication.

Figure 4:
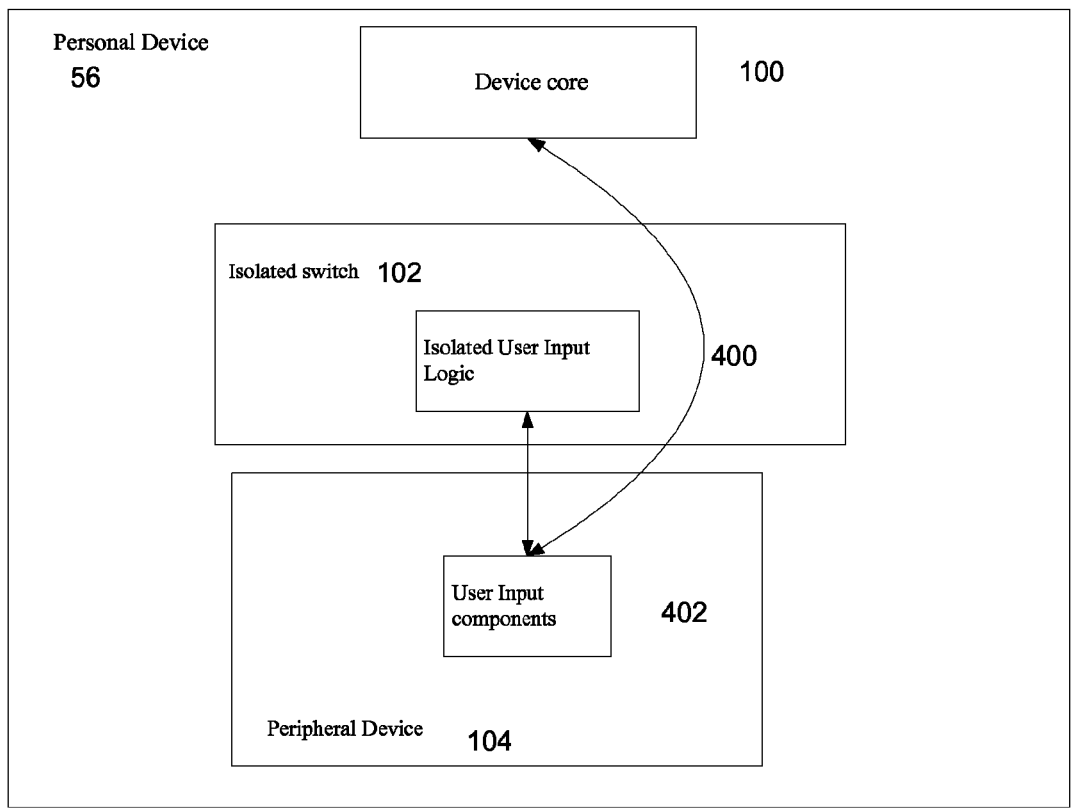
FIG. 4 shows yet another embodiment of a personal device with a security switch disclosed herein.

FIG. 4 shows yet another embodiment 56 of a personal device with a security switch disclosed herein. Device 56 includes in addition to all the components of device 50 an isolated user input logic (or simply "logic") 400 as a component of isolated switch 102 and at least one user input component 402 included in at least one of peripheral devices 104. Component 402 may be any known input component such as a keyboard or a touch screen.

Isolated user input logic 400 is another inventive sub-element disclosed herein, which contrasts with prior art in terms of both structure and purpose. Logic 400 is an internal isolated component (in the sense defined above for switch 102) used for reading inputs, which is hooked to at least one subset of user input components 402 in parallel with and separately from device core 100. The hook-up may be done exemplarily by using keys with a mutual mechanical part and independent electrical contacts. Logic 400 is isolated from other components of the personal device in the sense that the inputs read from user input components 402 cannot be affected either directly or indirectly by device core 100 or by peripheral devices 104. This isolation prevents manipulation of logic 400 by the software of the personal device. Logic 400 may have different implementations depending on the user input component(s) 402 to which it is hooked.

In use, when a user wants to enter an input to the security switch (e.g. by pressing keys on the keyboard) the input is entered by operating a user input component 402 to enter the input for security switch and logic 400 reads the input from component 402 in an independent operation (i.e. independently from device core 100).

Examples of user input logic 400 hooks include:
1. Hook to an "end call" button and a "start call" button.
2. Hook to an integrated cover, meaning that operation will be initiated by closing\ shifting the cover.
3. Hook to a keyboard, meaning that operation will be initiated by the user pressing a combination or sequence of keys.
4. Hook to a "mute mode" button, e.g. in an IP-Phone.
5. Hook to a handset placement, meaning that operation will be initiated by the user plug in/out the handset.
6. Hook to a stylus holder, meaning that operation will be initiated by the user placing the stylus back in the stylus holder and/or removing the stylus from the stylus holder e.g. in a Pocket PC\PDA.

Figure 5:
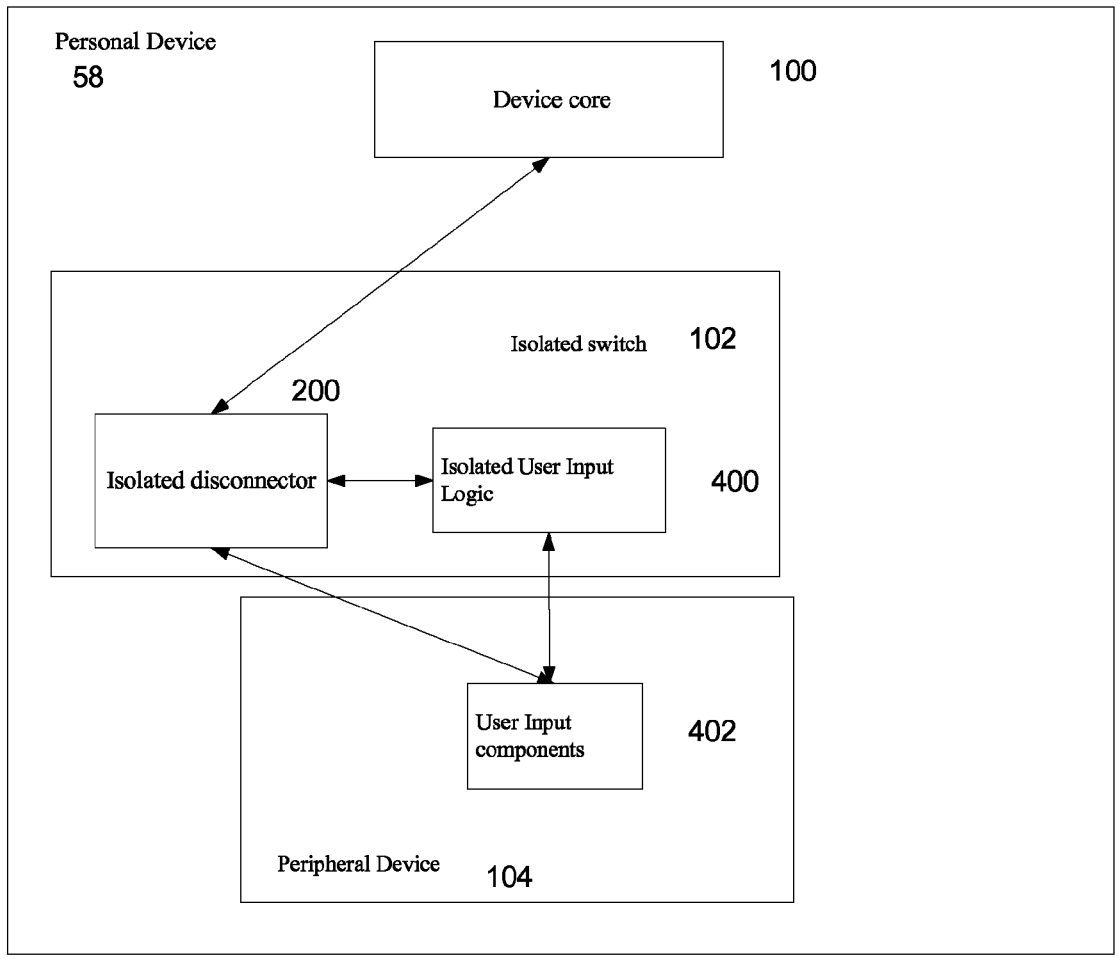
FIG. 5 shows yet another embodiment of a personal device with a security switch disclosed herein.

FIG. 5 shows yet another embodiment 58 of a personal device with a security switch disclosed herein. Device 58 includes in addition to all the components of device 56 an isolated disconnector 200. In contrast to device 52, disconnector 200 in device 58 disconnects and reconnects only different subsets of user input components 402 from the device core, for preventing inputs from reaching device core 100. This prevents unauthorized input capture by the software of the personal device or by other means (e.g. a keyboard sniffer), meaning that the input is secured. In use, under the same circumstance as described for device 56, a user input component 402 is operated by the user to enter an initial input for the security switch.

Logic 400 reads the initial input as an independent operation and operates disconnector 200 to disconnect the respective user input component from the device core (for enabling continued input in a secure environment, e.g. secure input of a user PIN code). The user input component is then operated by the user to continue entering inputs for the security switch as an independent operation (while the input cannot be captured by any entity except the security switch). At the end of the input operation, logic 400 operates disconnector 200 to restore the connection of the disconnected subset of user input components 402 to device core 100.

Figure 6:
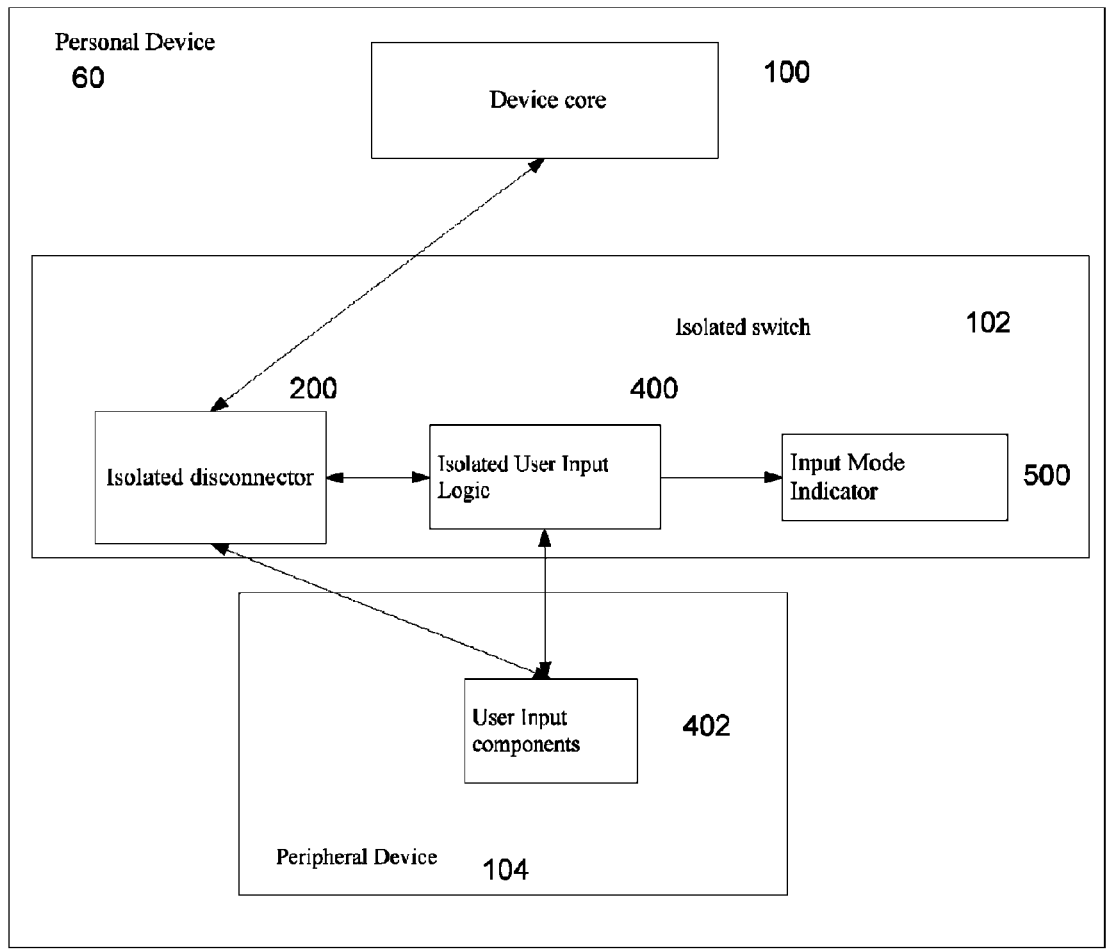
FIG. 6 shows an embodiment of a personal device with an input solution for security switch disclosed herein.

FIG. 6 shows an embodiment 60 of a personal device with an input solution for security switch disclosed herein. Device 60 includes in addition to all the components of device 58 an input mode indicator (e.g. a LED) 500. Indicator 500 provides visual indication of the state of logic 400, i.e. a visual indication that logic 400 operates disconnector 200 to disconnect user input components 402 from device core 100, or an indication that none of user input components 402 are disconnected by logic 400 via disconnector 200, or an indication of the input read by logic 400. The input mode indicator is "isolated" in the same sense as logic 400 and controlled only by logic 400 which contrasts with prior art in terms of structure. This prevents manipulation of indicator 500 by the software of the personal device or by other means, meaning that false indication or notification is impossible. That is, the security switch can display fully or partially the information passed to/through the switch to the user (e.g. for the user to review, or to ensure user awareness of the operation being done). Note that this functionality is provided also in all other embodiments that include an input mode indicator such as indicator 500.

Under similar use circumstances as described for device 58, the security switch is used as follows: User input component 402 is operated by the user to enter an initial input for security switch. Logic 400 reads the initial input from user input component 402, operates disconnector 200 to disconnect input component 402 from device core 100 (for enabling continued input in a secure environment) and enables indicator 500. Indicator 500 is used by the user to visually verify a secure input environment. Input component 402 is operated by the user to continue entering inputs to the security switch. At the end of input operations, logic 400 operates disconnector 200 to restore the connection of input component 402 to device core too and disables indicator 500. Indicator 500 is then used by the user to visually verify the restoration of the input environment to the initial state.

Figure 7:
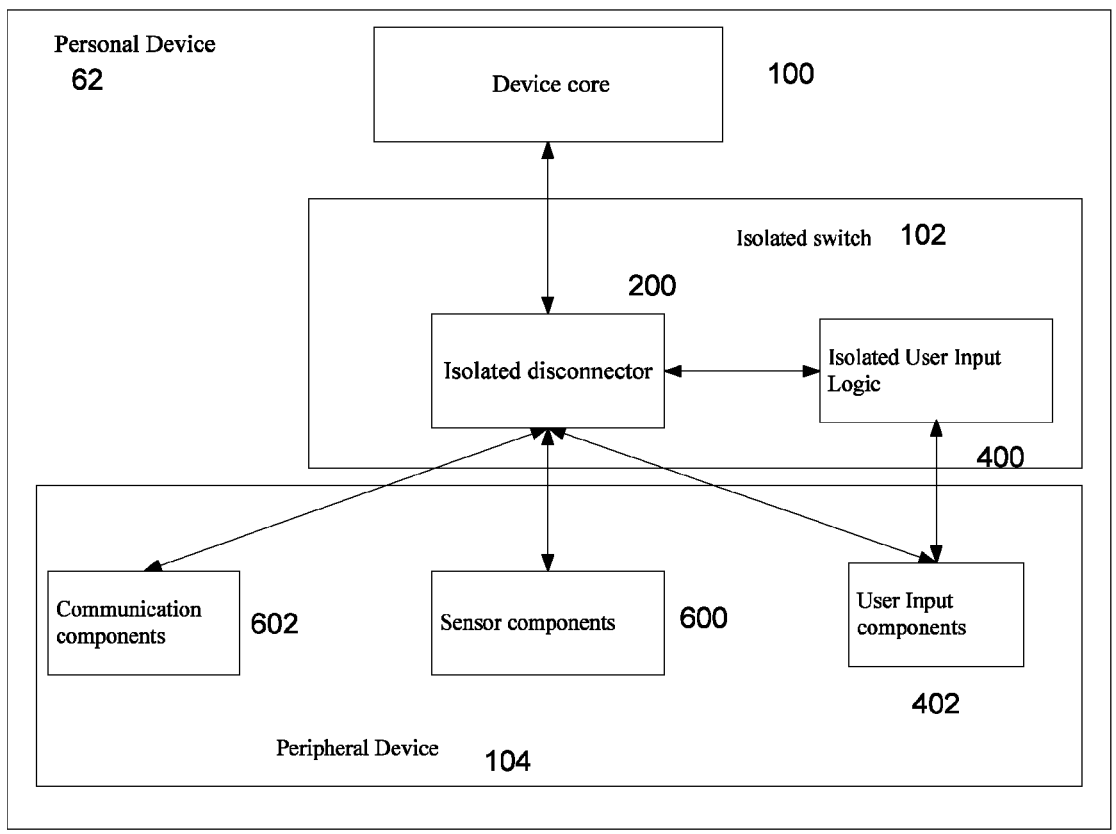
FIG. 7 shows yet another embodiment of a personal device with a security switch disclosed herein.

FIG. 7 shows yet another embodiment 62 of a personal device with a security switch disclosed herein. Device 62 combines device 52 and device 58, where peripheral devices 104 (described in device 50) include user input components 402 (described in device 56), communication components 602 and sensor components 600 (described in device 50 as sub-parts of peripheral devices 104). Device 62 provides functionalities of both device 52 and device 58.

Figure 8:
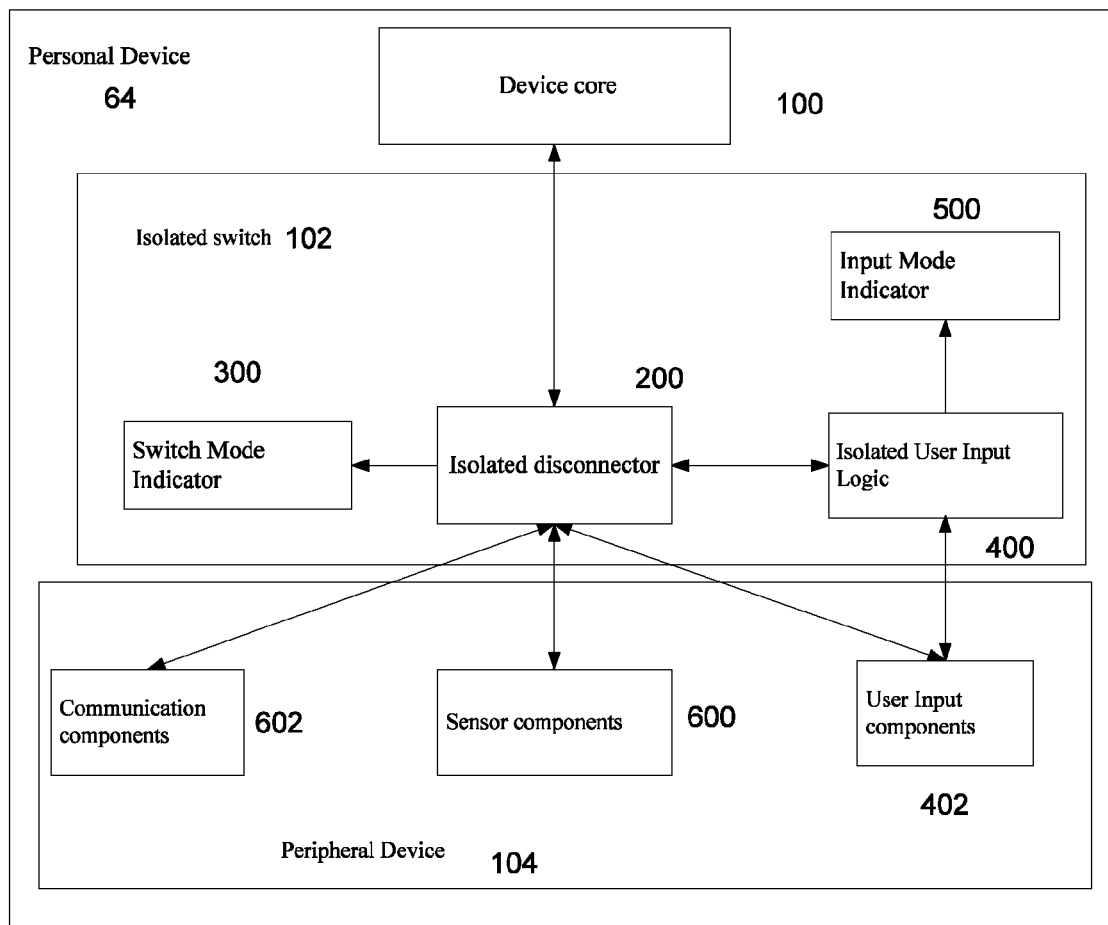
FIG. 8 shows yet another embodiment of a personal device with a security switch disclosed herein.

FIG. 8 shows yet another embodiment 64 of a personal device with a security switch disclosed herein. Device 64 combines device 54 and device 60 where peripheral devices 104 (described in device 50) include user input components 402 (described in device 56), communication components 602 and sensor components 600 (described in device 50 as sub-parts of peripheral devices 104). Device 64 provides functionalities of both device 54 and device 60.

Figure 9:
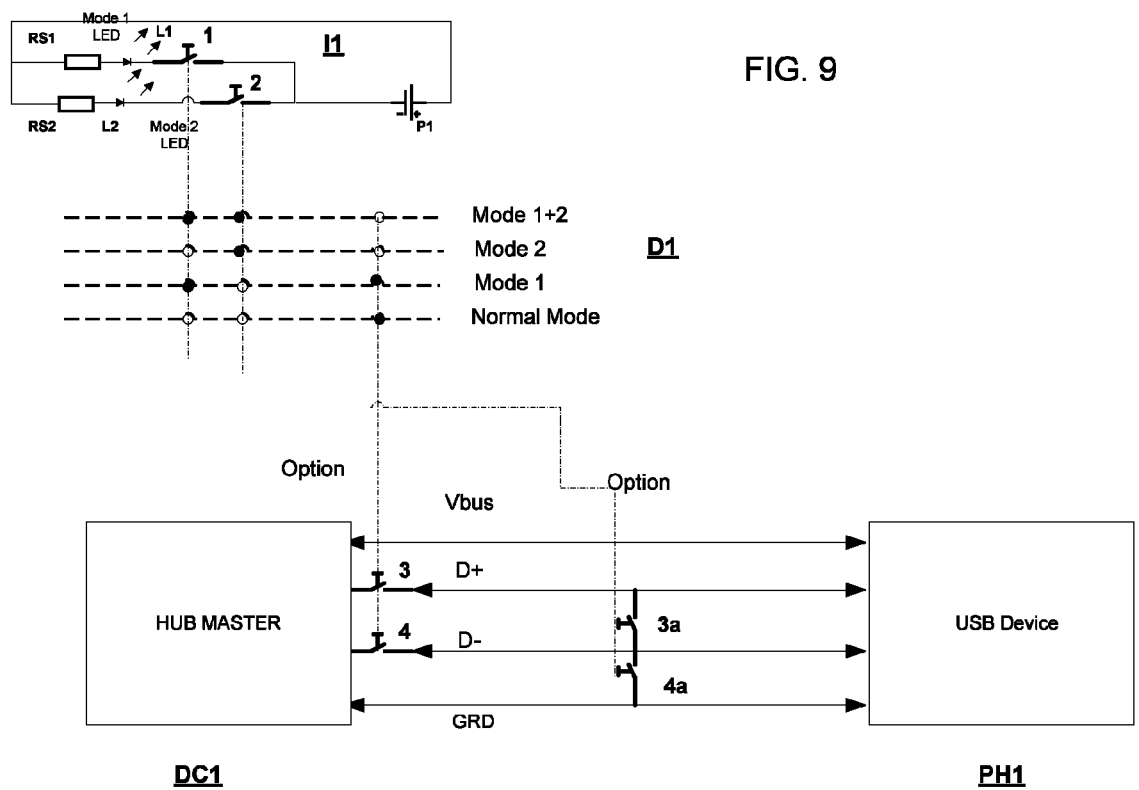
FIG. 9 shows an example of an electro-mechanical implementation of an isolated switch disclosed herein.

FIG. 9 shows an example of an electro-mechanical implementation of an isolated switch 102, which includes disconnector 200 and switch mode indicator 300. FIG. 9 includes DC1 as device core 100, PH1 (USB Device) as communication component 602, D1 (Hub Master) as an electro-mechanical implementation of disconnector 200 and I1 as an electrical implementation of indicator 300. D1 is a multi-positional switch that has four states: normal, mode 1, mode 2 and mode 1+2. The "normal" mode of D1 includes open contacts 1, 2 and closed contacts 3, 4 (or normally opened contacts 3a, 4a). If D1 is in normal mode, DC1 is connected to PH1 and the circuits of l1 and L2 of Il are open, meaning that the LEDs of mode 1 and mode 2 are off. When D1 is in "mode 1", contacts 3, 4 (or 3a, 4a) remain in same state as in normal mode (due to the fact that communication component 602 is not affected by mode 1), and contact 1 closes the connecting power from P1 through a resistor RS1 to L1, which turns on the LED of mode 1.

When D1 is in "mode 2" contacts 3, 4 open and disconnect the data line between DC1 and PH1 (or contacts 3a, 4a shorten data lines D+, D− to ground) and contact 2 closes, connecting power from P1 through a resistor RS2 to L2, which turns on the LED of mode 2. When D1 is in "mode 1+2", contacts 3, 4 open and disconnect the data line between DC1 and PH1 (or contacts 3a, 4a short data lines D+, D− to ground) and contacts 1, 2 close, connecting power from P1 through RS1, RS2 to L1, L2, which turns on the LEDs of modes 1 and 2.

Switch 102 is isolated because D1 operates mechanically and its control cannot be affected by DC1 or PH1. There is no bypass to data lines D+, D−, so when contacts 3, 4 open (3a, 4a close), communication between PH1 and DC1 is disconnected without possibility of bypass.

Regarding components in various embodiments, examples of predefined subsets of sensor components 600 that can be disconnected by the disconnector in mode 1 include:
  1. Microphone, speaker and camera;
  2. Microphone and camera (in case that the speaker is proved to be unable to capture voice, it is possible to leave it connected and to gain more functionally).

Examples of predefined subsets of communication components 602 that can be disconnected by the disconnector in mode 2 include.
  1. RF communication components;
  2. Bluetooth, infra-red and\or NFC (Near Field Communication) components, e.g. in a mobile phone where NFC might be used for PayPass (Electronic Payment) and Bluetooth\Infra-Red might be used for data transfer;
  3. WiFi or Wimax components.

FIG. 10 shows an example of electrical implementation of isolated switch 102 which includes disconnector 200 (represented by D2), switch mode indicator 300 (represented by ID and isolated user input logic 400 (represented by K1). D2 is implemented via a relay R. I1 is implemented via a switch mode LED (as shown in FIGS. 9) and K1 is implemented by independent Keys 1, 2, 3.

When Key 1 and Key 2 are pressed simultaneously, relay R operates and opens contacts to circuit(s) that have to be interrupted, closes contact R and stays energized while Key 3 is in normal position and turns on the LED. When key 3 is pressed, relay R is released and interrupted circuit(s) return to normal state.

Switch 102 is isolated because the relay R coil and K1 (which are the control elements of D2) are not electrically connected to any other components and are not adjacent to any other components or are shielded from other components, so they cannot be operated directly or indirectly (cross-talk) by other components. There is no bypass to circuits interrupted by relay R.

FIG. 11 shows another example of an electrical implementation of isolated switch 102 which includes disconnector 200 (represented by D3), switch mode indicator 300 (represented by I1 and isolated user input logic 400 (represented by K2). D3 is implemented via a latch relay LR3. I1 is implemented via a LED. K2 is implemented by independent Keys 1, 2, 3, 4 and latch relays LR1 and LR2.

When Keys 1, 2, 3 are pressed in this exact order, latch relay LR3 operates and opens contacts to the circuit(s) that have to be interrupted and turns on the LED. Latch relays LR1, LR2 and LR3 stay in latched mode until key 4 is pressed. When key 4 is pressed, the interrupted circuit(s) returns to normal state.

Switch 102 is isolated because the relay LR3 coil and K2 (which are the control elements of D3) are not electrically connected to any other components and are not adjacent to any other components or are shielded from other components, so they cannot be operated directly or indirectly (cross-talk) by other components. There is no bypass to circuits that are interrupted by latch relay LR3.

FIG. 12 shows an example of electrical/electronic implementation of isolated switch 102, which includes disconnector 200 (represented by D2), switch mode indicator 300 (represented by ID, isolated user input logic 400 (represented by K3) and input mode indicator 500 (represented by I2). D2 is implemented via relays R1 and R2, Il is implemented via LED L1, and I2 is implemented via LED L2 (same as L1) and K3 is implemented as independent hooks to existing Keys 0, 1, 2, 3, 4, 5 (while Key 5 has two contacts), Flip-flops FL1, FL2, FL3, FL4, FL5, FL6 and One-Shots ON1, ON2, ON3, ON4 and ON5. When key 0 is pressed, FL1 changes state and operates R1, which disconnects the required subset of peripheral devices 104 and turns on L1, meaning the security switch enters a "secure mode". For exiting the secure mode, the user presses Key 1, which activates ON1 to send a signal to FL3. FL3 changes state and enables operation of FL4. The user then presses Key 2, which activates ON2 to send a signal to FL4. FL4 changes state, enables operation of FL5 and activates FL2. FL2 changes state and operates R2. R2 disconnects the main keyboard from device core 100 and turns on L2 (now the security switch has a secure input). The user then presses Keys 3 and 4 in that exact order, which causes FL5, then FL6 and then FL1 to change state and to release R1. R1 reconnects the previously disconnected subset of peripheral devices 104, turns off L1 and connects the ground to Key 5 (second contact). Key 5 is used to reset the flip-flop sequence FL3, FL4, FL5, FL6 for reentering the key sequence, and causes FL2 to change state and release P2. R2 then reconnects the main keyboard and turns off L2, meaning the security switch returns to normal mode.

Switch 102 is isolated because the relay R1 coil, relay R2 coil and K3 (which are the control elements of D2) are not connected electrically to any other components and are not adjacent to any other components, or are shielded from other components (keys 0, 1, 2, 3, 4 are connected to main keyboard only mechanically), so they cannot be operated directly or indirectly (cross-talk) by other components. There is no bypass to circuits that are interrupted by relay R1 and R2.

Figure 13:
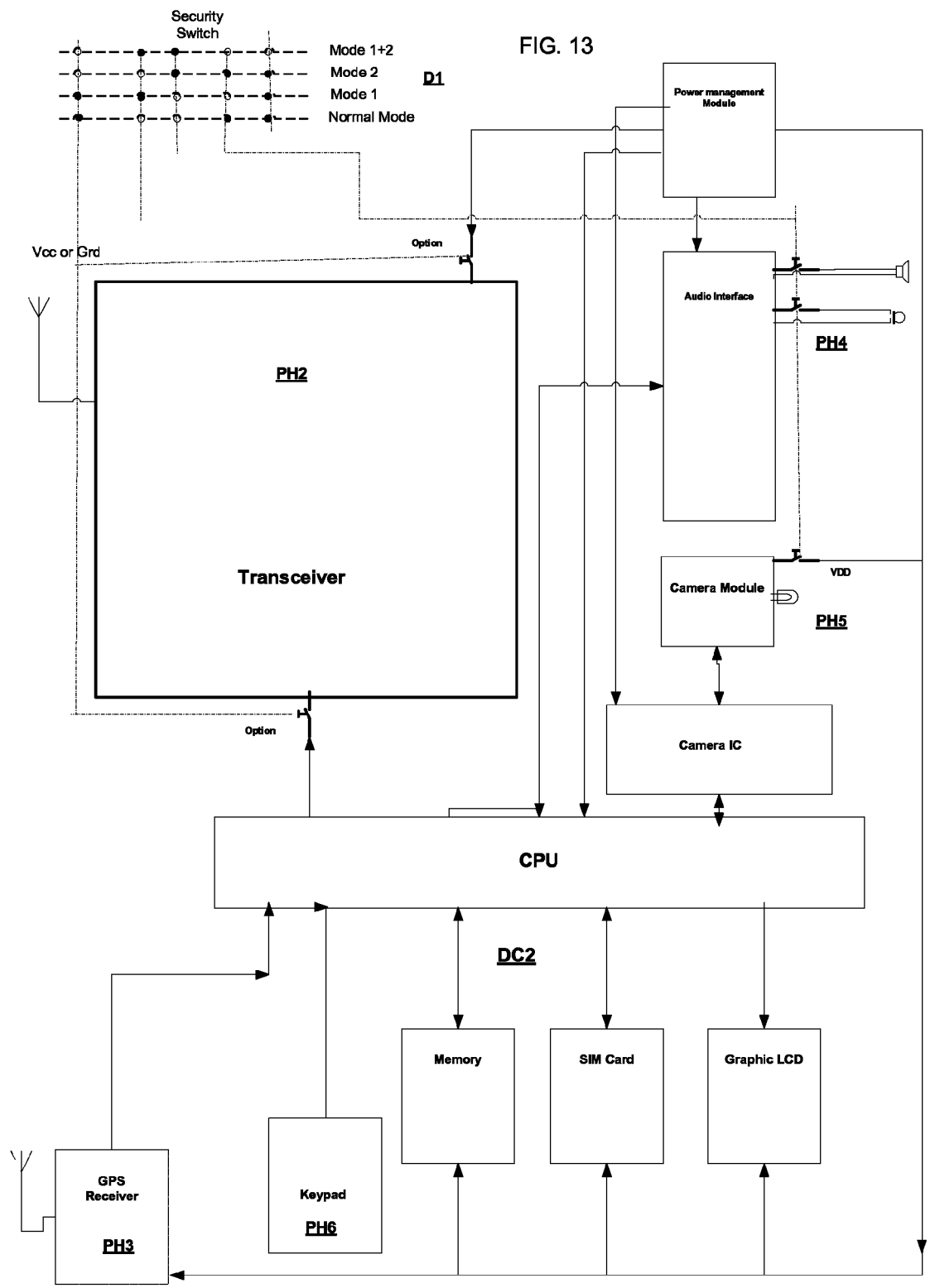
FIG. 13 shows an example of an electro-mechanical implementation of an isolated switch disclosed herein.

FIG. 13 shows an example of an electro-mechanical implementation of isolated switch according to an embodiment disclosed herein which includes disconnector 200 (represented by D1) in a mobile terminal (e.g. mobile phone). In this embodiment, parts of the security switch are distributed through the mobile phone. The mobile phone includes a device core 100 (represented by DC2) with a CPU, a memory, a SIM card, a graphic LCD, a camera IC, an audio Interface, and a power management module; PH2, PH3 representing communication components 602; a transceiver PH2 and a GPS receiver PH3; PH4 and PH5 representing sensor components 600; and PH6 as user input component 402. PH4 consists of a microphone and a speaker, PH5 consists of a camera and PH6 consists of a keyboard. All components and subcomponents are interconnected as shown. Note that some of the mobile terminal (phone) components may be included in a USB device (e.g. USB speakers for mobile phones).

In mode 1, D1 disconnects PH4 and PH5. In mode 2, D1 disconnects PH2 (for disconnecting PH2, D1 can disconnect the power module or the CPU from PH2). In mode 1+2, D1 disconnects PH4, PH5 and PH2. However, PH3 and PH6 are not affected by the modes of the security switch.

Figure 14:
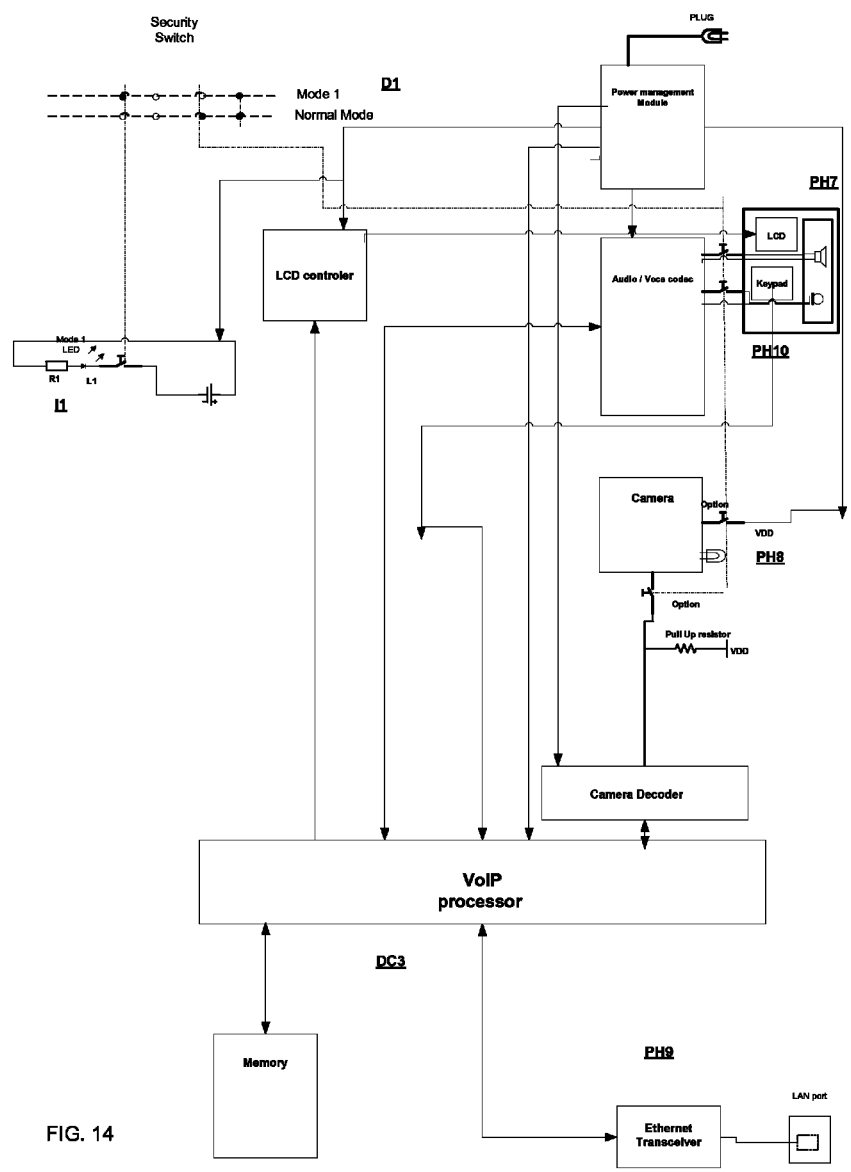
FIG. 14 shows an example of an electro-mechanical implementation of isolated switch disclosed herein.

FIG. 14 shows an example of an electro-mechanical implementation of isolated switch disclosed herein. In this implementation, the isolated switch includes a disconnector (represented by D1) and a switch mode indicator (represented by ID in, exemplarily, an IP-Phone. The IP phone includes a device core (represented by DC3) with a VoIP processor 151, a memory 152, an audio/voice codec 153, a power management module 154, a LCD controller 155, a LCD 156 and a camera decoder 157. PH7 and PH8 represent sensor components 600, PH9 represent communication component 602 and PH10 representing user input component 402. PH7 is a microphone, PH8 is a speaker, PH9 is a camera, PH10 is a keyboard and PH11 is an Ethernet transceiver. All components and subcomponents are interconnected as shown.

The security switch has only one mode (mode 1), due to the fact that mode 2 and mode 1+2 are not required in this implementation. In mode 1, D1 disconnects PH8 and PH7 and activates I1. As shown in FIG. 14, a pull-up resistor 158 can be used to protect the open circuit between PH9 and DC3.

Figure 15:
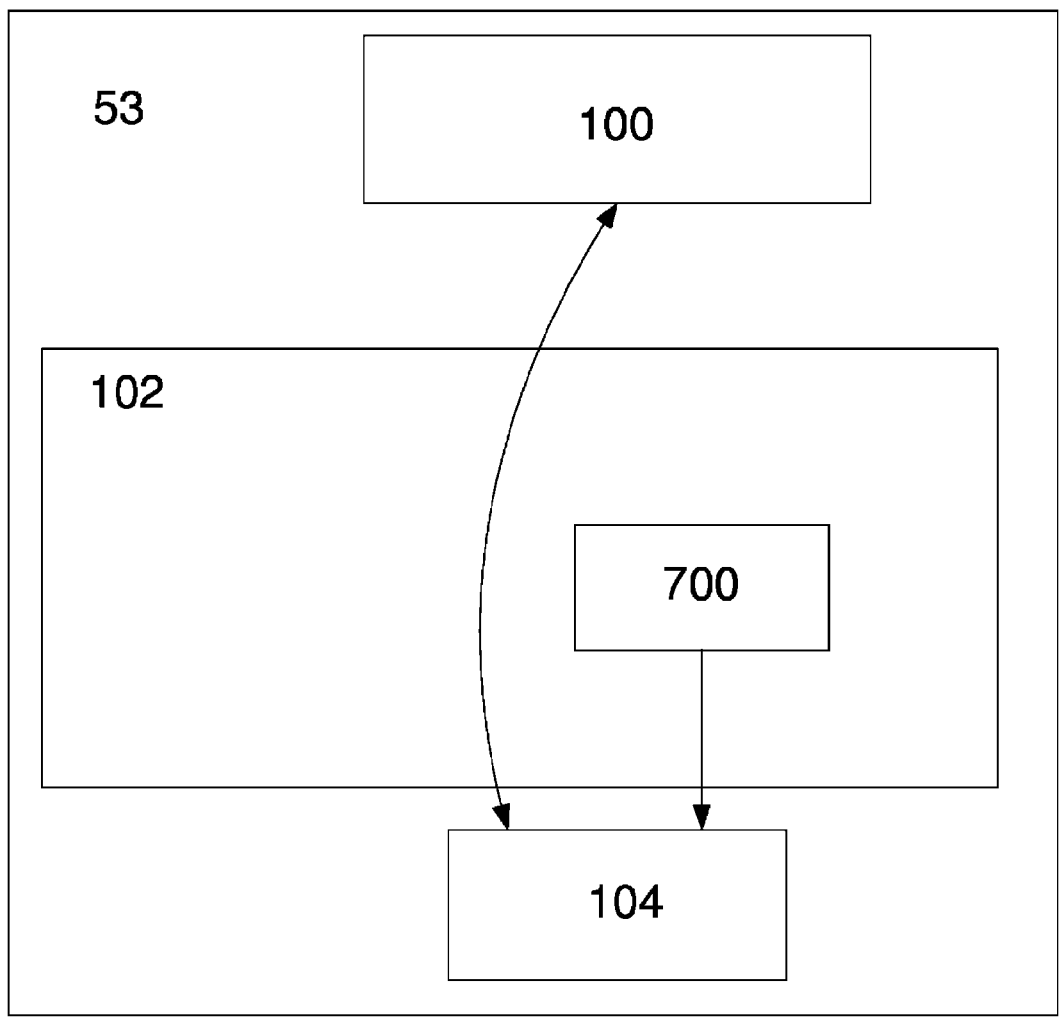
FIG. 15 shows yet another embodiment of a personal device with a security switch disclosed herein.

FIG. 15 shows yet another embodiment 53 of a personal device with a security switch disclosed herein. Device 53 includes an isolated switch which includes in addition to components of switch 102 an isolated controller 700. Controller 700 is isolated in the same sense as logic 400, i.e. it is operated only through isolated logic 400. It can send signals to the peripheral devices, but which cannot be operated or affected by the personal device. This prevents manipulation of isolated controller 700 by the software of the personal device or by other means, meaning that receiving a false signal is impossible. The isolated controller and the user input logic can each be implemented as a CPU.

Figure 16:
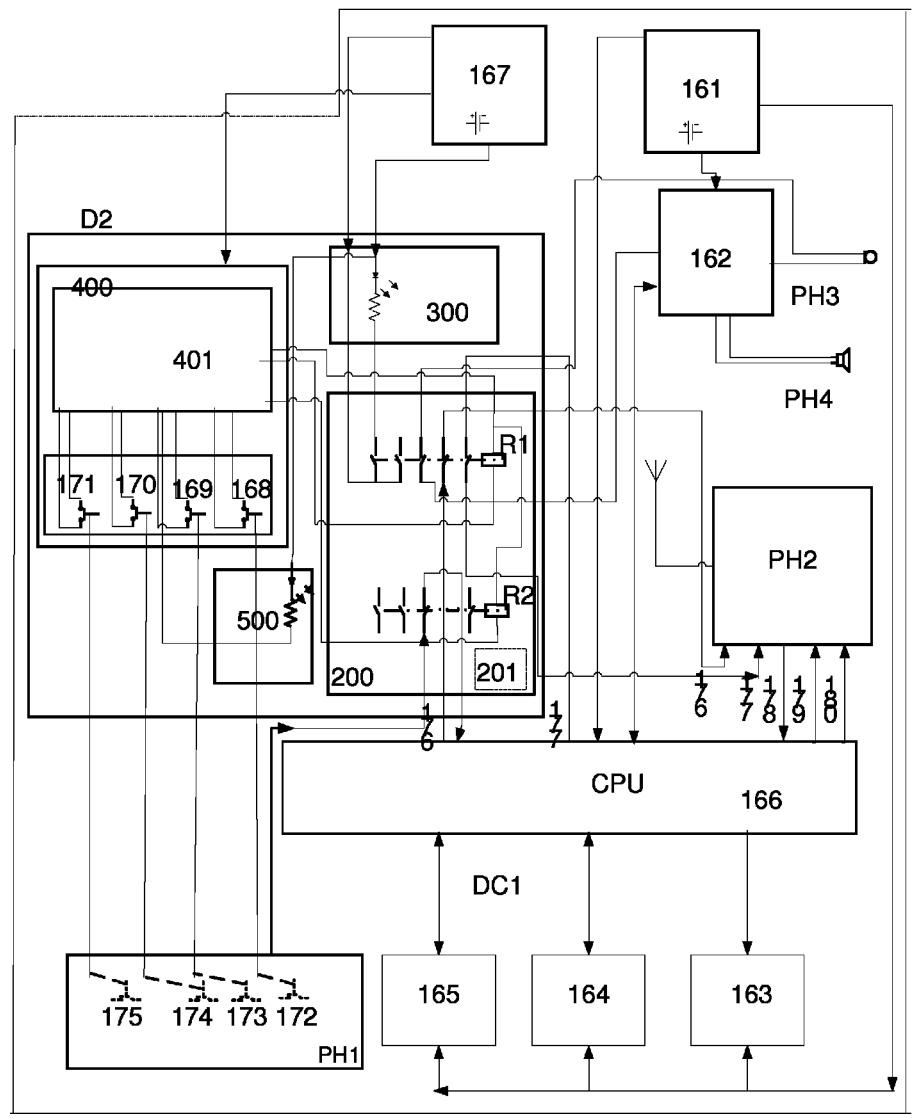
FIG. 16 shows an example of electrical/electronic implementation of an isolated switch with partial disconnection disclosed herein.

Under similar use circumstances as described for device 56, the security switch may be used here as follows: when a user wants to enter an input (e.g. by pressing keys on the keyboard) the input is entered as described with reference to the embodiment in FIG. 4. That is, the input is entered by operating user input component 402 with logic 400 reading the input from component 402 in an independent operation. In addition, logic 400 then operates isolated controller 700, which sends a signal or signals to peripheral devices 104. The received signals then modify the operation of peripheral devices 104. In contrast with the operation of device 56, in device 53 one can use a combination of user input and controller to modify the operation of the device and not just to perform connect/disconnect operations. FIG. 16 shows an example of electrical/electronic implementation of an isolated switch (represented by D2) with partial connection or disconnection functionality disclosed herein. The switch includes all the components of the embodiment in FIG. 12, but can be operated to only partially connect or disconnect a peripheral device from the personal device core. The implementation is exemplarily for a mobile terminal (e.g. mobile phone). The mobile terminal includes a device core (represented by DC1) with a CPU 166, a memory 165, a SIM card 164, a graphic LCD 163, an audio interface 162 and a power management module 161; transceiver PH2 representing communication components 602; PH3 and PH4 representing sensor components 600; and PH1 as user input component 402. PH3 consists of a microphone and PH4 consists of a speaker, and PH1 consists of keyboard. Power source 167 is used as a separate power source for only the switch.

In this embodiment, the partial connection or disconnection feature is enabled by a special interconnection of relays 201 included in disconnector 200 and other elements. Isolated logic 400 includes a logic module 401 for reading code and keys "mode in" 168, "mode out" 169 and "0-9" 170. Optionally, it can also include other keys 171. Keyboard PH1 includes a key 172 which serves as a "end of call" key, a key 173 which serves as a "start of call" key, keys 174 which represent numbers 0-9 and, optionally, keys 175 which can be used for other purposes. A first data line 176 is for transferring data of SMS/calls between CPU 166 and transceiver PH2. A signal 177 enables transferring (out) long packets of data from CPU 166. Signal 177 has highest priority in PH2. A second data line 178 is for transferring data from PH2 to CPU 166. A third data line 179 is for transferring data from CPU 166 to PH2. Additional signals are marked 180. All components and subcomponents are interconnected as shown.

For entering mode 1, an authorized user presses key 172 which is mechanically connected with key 168 which operates relay R1 of disconnector 200. R1 disconnects PH3 from audio interface 162 and disconnects data line 176 and/or signal 177 from CPU 166. The isolated switch thus disconnects part of PH2 from DC1, while other parts remain connected. This represents the "partial disconnection" referred to above. When the data line responsible for sending SMS\call data is disconnected, and\or when a signal responsible for enabling transfer of long data packet is also disconnected, from CPU 166 (e.g. by R1 disconnecting data line 176), transceiver PH2 can receive SMS\call data, can send location updates, since 178, 179 and 180 are not switched off, but cannot send out SMS and call data. In other words, acting as a "man in the middle", the security switch can approve operations between the device core and the peripheral device, by passing the signal/data only to response of manual approval (e.g. button press on the switch). For example, in a mobile phone, the security switch can approve making/receiving calls or sending/receiving SMS or MMS. Note that this functionality exists also in the implementation in FIG. 17. Changes done by components 102 or D2 or 200 cannot be bypassed by device core DC1, since signal 177 has highest priority in PH2 and since D2 is isolated. R1 also connects the LED of mode indicator 300, which shows the authorized user that switch is now in mode 1.

For exiting mode 1, an authorized user presses key 173, which is mechanically connected with key 169. This resets relay R1. R1 connects PH3 to audio interface 162 and data line 176 and signal 177 to CPU 166. R1 also disconnects the LED of mode indicator 300, which shows the authorized user that the switch is now in normal mode.

Without additional actions, the authorized user thus prevents voice capture and sending calls/SMS by malicious software.

In other words, acting as a "man in the middle", the security switch can stop/resume communication between the device core and the peripheral device by stopping/resuming the signal/data transfer that passed through the switch. Note that this functionality exists also in the implementation in FIG. 17. Switch mode indicator 300 can display to the user the data that is communicated and approve its transfer.

For entering a secure PIN, an authorized user presses a preset number using keys 174, thereby operating keys 170, then presses key 172 which is mechanically connected with key 168. In response, logic 400 operates relay R2 of isolated disconnector 200 and relay R2 disconnects PH1 from CPU 166. Logic 400 also operates the LED of input mode indicator 500, which shows the authorized user that the secure PIN can be entered. After entering the secure PIN and performing (if necessary) other operations, the authorized user presses a key sequence or combination for exiting the secure mode. In response, logic 400 resets relay R2, which then reconnects PH1 to CPU 166. The LED is turned off, indicating that the switch is now in normal mode.

Figure 17:
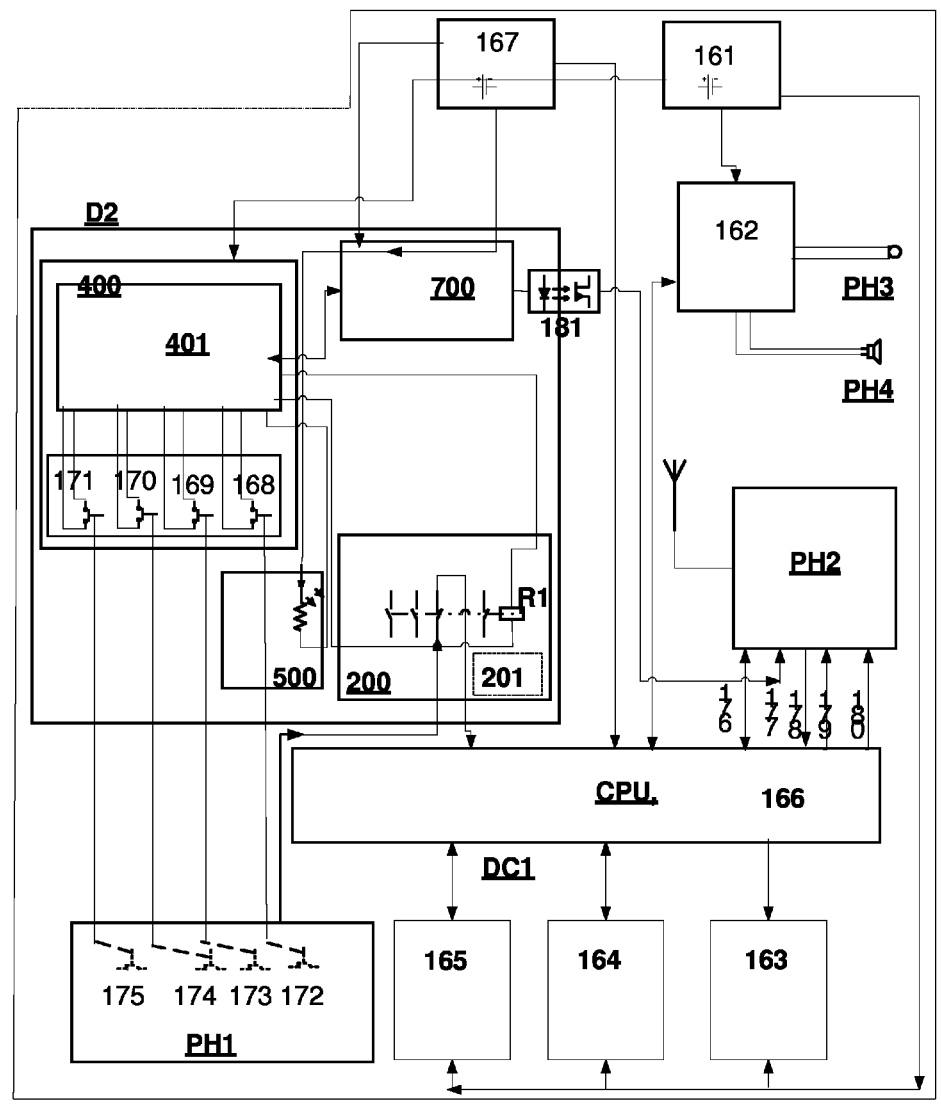
FIG. 17 shows an example of electrical/electronic implementation of an isolated switch with isolated controller disclosed herein.

FIG. 17 illustrates the use of the isolated controller through another example of an electrical/electronic implementation of an isolated switch (represented by D2). The implementation is exemplarily for a mobile terminal (e.g. mobile phone). The mobile phone includes a device core (represented by DC1) with a CPU 166, a memory 165, a SIM card 164, a graphic LCD 163, an audio interface 162, and a power management module 161, with transceiver PH2 representing communication components 602, PH3 (e.g. a microphone) and PH4 (e.g. a speaker) representing sensor components 600 and PH1 representing user input component (e.g. keyboard) 402. Isolated controller 700 is isolated from PH2 by an opto-coupler 181. All components and subcomponents are interconnected as shown.

Power source 167 is used as a separate power source for only the switch. Disconnector 200 includes relays 201. Isolated input logic 400 includes logic module 401 and keys 168, 169, 170, and, optionally, keys 171. Keyboard PM includes keys 172, 173, 174 and, optionally, keys 175. Data line "data1" marked 176 is for transferring data of SMS/calls. Signal "signal 1" 177 enables transferring (out) long packets of data from CPU 166. Signal "Signal 1" 177 has highest priority in PH2. Data line "data 2" marked 178 is for transferring data from PH2 to CPU 166. Data line "data3", marked 179 is for transferring data from CPU 166 to PH2. Additional signals are marked 180.

For entering a mode of restricted communication, an authorized user presses key 172 which is mechanically connected to key 168, which sends a signal of a correspondent logic state to isolated controller 700. Controller 700 then sends signal 177 to PH2 through the opto-coupler, disabling out-transfer of a long data packet. While such transfer is disabled, transceiver PH2 can receive SMS\call data and can send location updates, since 178, 179, 180 are enabled, but cannot send SMS and call data. Changes done by components 102 or D2 or 200 cannot be bypassed by device core DC1, since signals 177 have highest priority in PH2. For exiting the mode of restricted communication, an authorized user presses "start of call" key 173 which is mechanically connected with "mode out" key 169, thereby sending a signal of a correspondent logic state to isolated controller 700. Controller 700 stops signal 177 to PH2 through opto-coupler 181, thereby enabling transfer out of long data packet.

As a result of the actions above and without additional actions, an authorized user prevents sending SMS/calls by malicious software. For entering a secure PIN, an authorized user presses a preset number using keys 174 thereby operating keys 170, then presses key 172 which is mechanically connected with key 168 of isolated input logic 400. In response, logic 400 operates relay R1 of isolated disconnector 200 and relay R2 disconnects PM from CPU 166. Logic 400 also operates the LED of input mode indicator 500, which shows the authorized user that the secure PIN can be entered. After entering the secure PIN and performing (if necessary) other operations, the authorized user presses a key sequence or combination for exiting the secure mode. In response, logic 400 resets relay R1, which connects PH1 to CPU 166. The LED is turned off, indicating that the switch is now in normal mode.

In other words, acting as a "man in the middle", the security switch (through the controller) can modify the behavior/operation of the peripheral device or the signal/data transfer that passed through the switch (e.g. encode the data for transfer).

Figure 18:
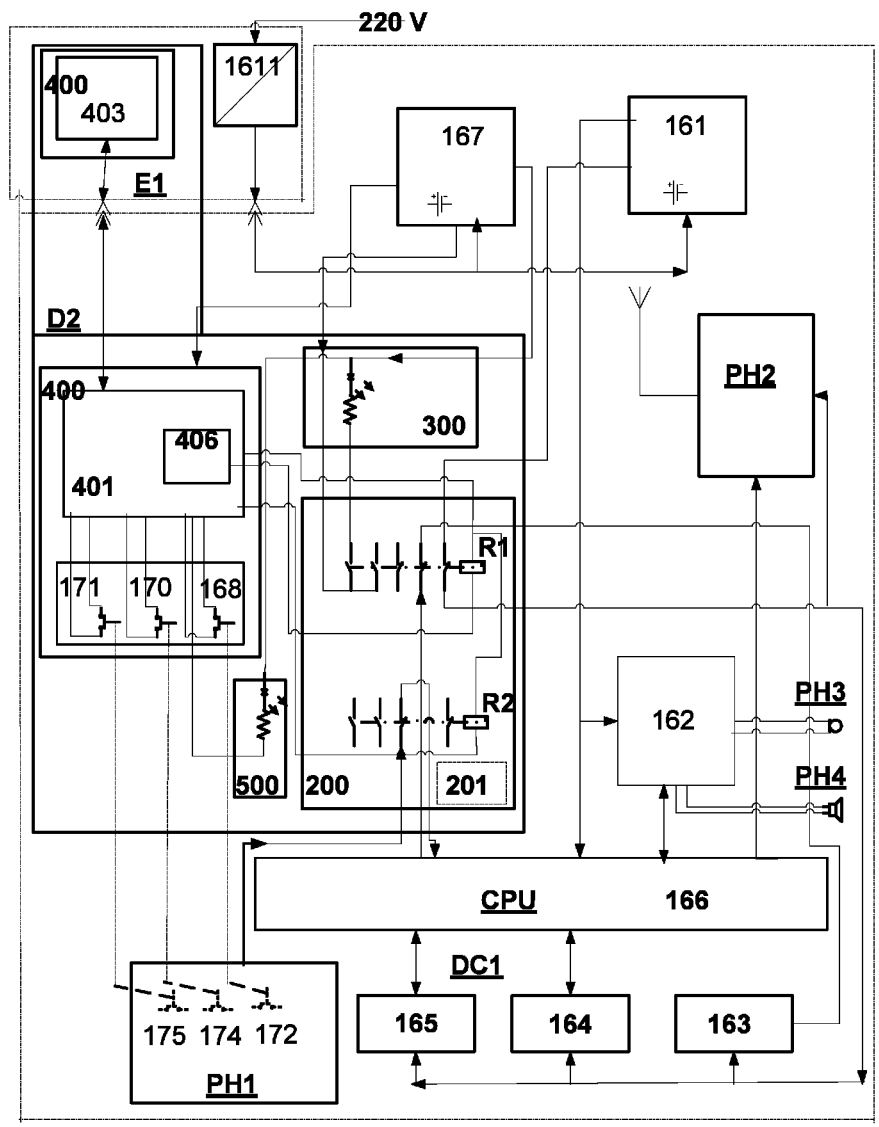
FIG. 18 shows an example of electrical/electronic implementation of an isolated switch with external and internal components for mutual triggering of operation disclosed herein.

FIG. 18 shows another example of an electrical\electronic implementation of an isolated switch (represented by D2) disclosed herein. The implementation is exemplarily for a mobile terminal (e.g. mobile phone). The mobile phone includes a device core DC1 (representing core 100) with a CPU 166, a memory 165, a SIM card 164, a graphic LCD 163, an audio Interface 162, and a power management module 161; transceiver PH2 representing communication components 602; PH3 and PH4 representing sensor components 600; and PH1 as user input component 402. PH3 consists of a microphone, PH4 consists of a speaker, and PHI consists of keyboard. Disconnector 200 includes relays 201. Isolated logic module 400 includes logic module 401, a timer 406, keys "mode in" 168, keys "0-9" 170 and "other" keys 171. Power source 167 is used as a separate power source for only the switch.

Part of isolated logic 400 is located in an external (to the personal device) unit (component) E1. E1 can be connected only by an authorized user. E1 is located in the same unit with a mobile terminal charger 1611 and connected to the mobile terminal simultaneously with charger 1611. E1 includes a memory 403, while the internal part of logic 400 includes timer 406. All components and subcomponents are interconnected as shown. Note that while in FIG. 18 only one part (E1) of the security switch is external while all other parts are internal, in other embodiments more than one part can be external, and fewer parts can be internal. Exemplarily, a single part such as disconnector 200 or logic module 401 may be internal i.e. disconnector 200 or logic module 401 is enclosed within an envelope or surface of the personal device or positioned at least partially on the surface of the envelope of the personal device, with all other parts being isolated in external part E1.

As part of the routine operation of the logic module, timer 406 counts to a pre-determined value (e.g. 48 hours), then operates relay R1. R1 disconnects display 163 from CPU 166 and disconnects memory 165, SIM card 164 and display 163 from power supply 161. R1 also connects led of mode indicator 300, which shows an authorized user that switch is in blocked mode, but not malfunctioning. This renders the mobile terminal unusable for a non-authorized user, who does not have external part E1 with secure code written in its memory 403.

For exiting a blocked mode, an authorized user connects external part E1 (together with its charger) and logic module 401 that can read code written in memory 403 of E1. If the code is correct, the logic module resets timer 406 that disconnects relay RE and the timer restarts the count. Relay R1 connects display 163 to CPU 166 and connects memory 165, SIM card 164 and display 163 to power supply 161. R1 also disconnects the LED of mode indicator 300, which shows the authorized user that switch is in normal mode. For entering a secure PIN, the authorized user presses a preset number using keys 174, then presses key 172 which is mechanically connected to key 168. In response to this sequence, isolated input logic 400 operates relay R2, which disconnects PH1 from CPU 166. The logic module also operates turns on the LED of input mode indicator 500, which shows the authorized user that secure PIN can be entered. After entering the secure PIN, the user can change code in the memory of E1 and conduct other operations. Then, the user can press a key sequence or combination for exiting the secure mode. In response, logic 400 resets relay R2, which re connects PH1 to CPU 166 and turns off the LED of input mode indicator 500. The switch now returns to normal mode.

Note that that implementation shown in FIG. 18 also enables an additional, "secure lock" mode of operation for preventing unauthorized access to the device (e.g. by disconnecting memory, display, or other crucial peripheral devices). The secure lock mode may be achieved using manual switching by the authorized user or automatic switching by the security switch (e.g. by the timer), In the secure lock mode, the device is completely unusable, as no operation can be performed on the device and no information can be retrieved from the device. This mode is therefore useful as an anti-theft measure. The secure lock mode may be combined with a secure mode exit, to prevent capture of the logic required to exit the security mode in a device (e.g. a secure PIN entry that can be captured only by the security switch). The secure lock mode may use the external part of the security switch (i.e. E1) for triggering the secure mode exit (e.g. by connecting/plugging the external part E1 to the device in order to exit the secure lock mode). During a secure lock mode the security switch may show indication of the switch mode or send notification that the device is in secure lock mode.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission reference is available as prior art to the invention.

While the invention has been described with respect to a limited number of embodiments, it will be appreciated that many variations, modifications and other applications disclosed herein may be made. Those skilled in the art will appreciate that the invention can be embodied by other forms and ways, without losing the scope disclosed herein. The embodiments described herein should be considered as illustrative and not restrictive.

What is claimed is:

1. A system for securing a personal device that includes a device core and a peripheral device from unauthorized access or operation, the personal device having an envelope or surface, the system comprising an internal isolated switch having operating functions that cannot be affected by either the personal device core or by a peripheral device, wherein the isolated switch includes an internal component located within the envelope or at least partially on the surface of the personal device and wherein the isolated switch internal component is selected from the group consisting of a mechanical element without an electrically operated bypass and an electronic/electrical element separated electrically from elements or components of the personal device.

2. The system of claim 1, wherein the isolated switch further includes an isolated disconnector for connecting and disconnecting the device core from the peripheral device or from a part of the peripheral device.

3. The system of claim 1, wherein the isolated switch further includes an isolated controller which can send a signal to the peripheral device or to a part of the peripheral device but which cannot be operated or affected by the personal device, the isolated controller thereby being capable of affecting operation of the peripheral device or of the part of the peripheral device.

4. The system of claim 1, wherein the isolated switch further includes an isolated external component and wherein the isolated internal and external components trigger together the isolated switch operation.

5. The system of claim 1, wherein the peripheral device further includes a user input component and wherein the isolated switch includes an isolated user input logic module for reading user inputs.

6. The system of claim 1, wherein the peripheral device is selected form the group consisting of a USB key, a USB MSD device, a USB Bluetooth device, a USB wireless device, a non-USB MSD device, a display and a memory.

7. The system of claim 1, wherein the internal component includes a plurality of elements distributed in the personal device.

8. The system of claim 1, wherein at least one element of the isolated switch is located in a component of the peripheral device.

9. The system of claim 1, wherein the isolated switch is configured to operate as man in the middle between the device core and the peripheral device, thereby being capable of affecting information exchanged between the device core and the peripheral device.

10. The system of claim 3, wherein the isolated controller is implemented as a central processing unit.

11. The system of claim 5, wherein the isolated user input logic module is implemented as a central processing unit.

12. The system of claim 2, wherein the isolated disconnector is operable to cut power to the peripheral device or to a part of the peripheral thereby effecting power savings.

13. The system of claim 3, wherein the isolated controller is operative to manipulate signal and/or data exchanged between the device core and the peripheral device.

14. The system of claim 5, wherein the isolated switch includes an indicator for displaying fully or partially the read user inputs.

15. The system of claim 9, wherein the isolated switch includes an indicator for displaying fully or partially the information exchanged between the device core and the peripheral device.

16. A method for securing a personal device that includes a device core and a peripheral device from unauthorized access or operation, comprising the steps of:
  a) providing an internal isolated switch having operating functions that cannot be affected by either the personal device core or the peripheral device, wherein the isolated switch includes an internal component located within the envelope or at least partially on the surface of the personal device, wherein the isolated switch internal component is selected from the group consisting of a mechanical element without an electrically operated bypass and an electronic/electrical element separated electrically from elements or components of the personal device, and wherein the isolated switch is configured to act as man in the middle between the device core and the peripheral device; and
  b) using the isolated switch to protect the device from unauthorized use or access.

17. The method of claim 16, wherein the step of using includes having an authorized user operate the switch to approve, disapprove or stop operations between the device core and the peripheral device.

18. The method of claim 16, wherein the step of using includes having an authorized user operate the switch to modify signal and/or data exchanged between the device core and the peripheral device.

19. The method of claim 16, wherein the step of using includes displaying fully or partially, to the authorized user, information exchanged between the device core and the peripheral device.

20. The method of claim 16, wherein the step of using includes using the isolated switch in a secure lock mode, thereby providing anti-theft protection.

\* \* \* \* \*